United States Patent [19]

Gillett et al.

[11] 4,427,621

[45] Jan. 24, 1984

[54] JACKING MECHANISM FOR UPPER INTERNALS STRUCTURE OF A LIQUID METAL NUCLEAR REACTOR

[75] Inventors: James E. Gillett; Arthur L. Wineman, both of Greensburg, Pa.

[73] Assignee: Westinghouse Electric Corp., Pittsburgh, Pa.

[21] Appl. No.: 280,167

[22] Filed: Jul. 2, 1981

[51] Int. Cl.³ .............................................. G21C 19/00
[52] U.S. Cl. ..................................... 376/260; 376/460
[58] Field of Search ................ 376/260, 262, 271, 460

[56] References Cited

U.S. PATENT DOCUMENTS

| | | | |
|---|---|---|---|
| 3,054,741 | 9/1962 | Tatlock et al. | 376/460 |
| 3,948,723 | 4/1976 | Andrea et al. | 376/271 |
| 4,002,529 | 1/1977 | Andrea et al. | 376/271 |
| 4,162,935 | 3/1979 | Wade | 376/460 |
| 4,192,558 | 3/1980 | Wade | 376/271 |

*Primary Examiner*—Sal Cangialosi
*Attorney, Agent, or Firm*—Kenneth R. Bowers

[57] ABSTRACT

A jacking mechanism for raising the upper internals structure of a liquid metal nuclear reactor which jacking mechanism uses a system of gears and drive shafts to transmit force from a single motor to four mechanically synchronized ball jacks to raise and lower support columns which support the upper internals structure. The support columns have a pin structure which rides up and down in a slot in a housing fixed to the reactor head. The pin has two locking plates which can be rotated around the pin to bring bolt holes through the locking plates into alignment with a set of bolt holes in the housing, there being a set of such housing bolt holes corresponding to both a raised and a lowered position of the support column. When the locking plate is so aligned, a surface of the locking plate mates with a surface in the housing such that the support column is then supported by the locking plate and not by the ball jacks.

Since the locking plates are to be installed and bolted to the housing during periods of reactor operation, the ball jacks need not be sized to react the large forces which occur or potentially could occur on the upper internals structure of the reactor during operation. The locking plates react these loads. The ball jacks, used only during refueling, can be smaller, which enable conventionally available equipment to fulfill the precision requirements for the task within available space.

3 Claims, 8 Drawing Figures

JACKING MECHANISM FOR UPPER INTERNALS STRUCTURE OF A LIQUID METAL NUCLEAR REACTOR

GOVERNMENT CONTRACT

This invention was conceived during performance of a contract with the U.S. Government designated DE-AC15-76-CL02395.

BACKGROUND OF THE INVENTION

This invention relates generally to liquid metal cooled nuclear reactors, particularly to a jacking apparatus for raising, lowering, and supporting an upper internals structure in a liquid metal reactor.

The design of the liquid metal nuclear reactor known as the Clinch River Breeder Reactor Plant incorporates a structure called an "upper internals structure" (UIS). The UIS has several functions: support and alignment of control rods above the reactor core fuel assemblies, support of instrumentation, core holddown, and coolant flow mixing. The UIS hangs from support columns supported from an "intermediate rotating plug" which is part of the reactor vessel head. The UIS is positioned at it lower end by radial keys which engage slots in a core barrel structure. The keys are important since these control UIS alignment and also oppose flow induced vibrations.

During reactor refueling the intermediate rotating plug must be rotated in order that a refueling machine may have access to all core fuel assemblies. This operation requires that the UIS be hoisted upward a distance (approximately 9½ inches) sufficient to clear the UIS keys from the core barrel slots such that the UIS and intermediate plug are free to rotate. A jacking mechanism is used to accomplish the required hoisting and lowering of the UIS during refueling.

The support system for the UIS includes the support columns which pass the dead weight and other loads of the UIS through the jacks to the intermediate plug which transfers the load to the reactor head, which in turn is supported by structural features of a surrounding building.

During hoisting for refueling, it is considered essential that the UIS support system successfully react the UIS dead weight (approximately 100,000 lbs.), and key-slot misalignment loads (magnitude varies with degree of misalignment).

During reactor operation, it is considered essential that the UIS support system successfully react UIS dead weight, seismic loads (1,000,000 lbs.) and, additionally, possible forces, alternatingly upward and downward, on the UIS due to rapid vapor expansion from the liquid metal coolant in the reactor due to an accident. This force could be of the magnitude of 4,000,000 lbs. Since the accident involved is considered less likely during refueling, this large load capability may not be required during refueling.

During hoisting and lowering, small alignment errors between the UIS and the core barrel slots impose misalignment loads on the jacking mechanism in order to force the keys into or out of the slots. The misalignment load which the jacking mechanism must overcome is a function of the misalignment magnitude.

The UIS guides and aligns control rods to enable these to drop into fuel assembly control rod guide tubes during a reactor shutdown or "scram". The time required for the control rods to drop into the reactor core, called the "scram time", is an important safety parameter which is adversely affected by any misalignment of the UIS with the reactor core. Therefore, the jacking mechanism must be able to raise and lower the UIS for refueling operations with precision to prevent alignment errors, particularly those in the vertical direction not corrected by key insertion. The margin of error in lowering the UIS is considered to be 30 thousandths of an inch over 27 feet.

In summary, the jacking mechanism and support system for the UIS of a liquid metal reactor of the Clinch River variety must be capable of reacting very large forces, while also accomplishing precision UIS positioning.

It has been discovered that conventional jacking systems which can meet the indicated load requirements are massive in size and are not sufficiently precise. Precision jacks are not sufficiently strong. As an added complication, it has developed that the area in which the jacks must be located is crowded with other necessary equipment such that massive jacks cannot easily be accommodated.

Consequently, it is desired to provide a jacking mechanism capable of reacting large forces and of precision positioning of a UIS for a liquid metal reactor.

SUMMARY OF THE INVENTION

The invention is an upper internals structure jacking mechanism (UISJM) comprising a plurality of conventional, synchronized ball jacks driven by a single motor, each jack within a housing assembly having one or more lock plates. The ball jacks are precision devices of relatively low strength (100,000 lbs. each is typical) but are together sufficient to raise and lower the UIS, providing dead weight support and misalignment loading.

Each housing assembly contains one or more locking plates which can lock the UIS support columns in either the up or down position. The locking mechanism may consist of two plates bolted 180 degrees apart into vertical slots or ridges in the housing assembly. One end of each plate pivots about a UIS support pin, engaging (when installed) raised locked and lowered locked surfaces in the housing thereby reacting all UIS loads in either position. The lock plates are sufficiently strong to provide all required operations loads on the UIS.

The complete UISJM has precise jacks useful during refueling hoisting (raising and lowering) operations sized to react misalignment and dead weight loads coupled with lock plates of sufficient strength to also react seismic and accident loads. The composite mechanism is not prohibitively large.

During the infrequent and short time intervals during hoisting, when the lock plates will not be installed, the probability of an accident or seismic event is considered to be acceptably small.

DETAILED DESCRIPTION

General Arrangement of Jacking Mechanism

Figure 1:
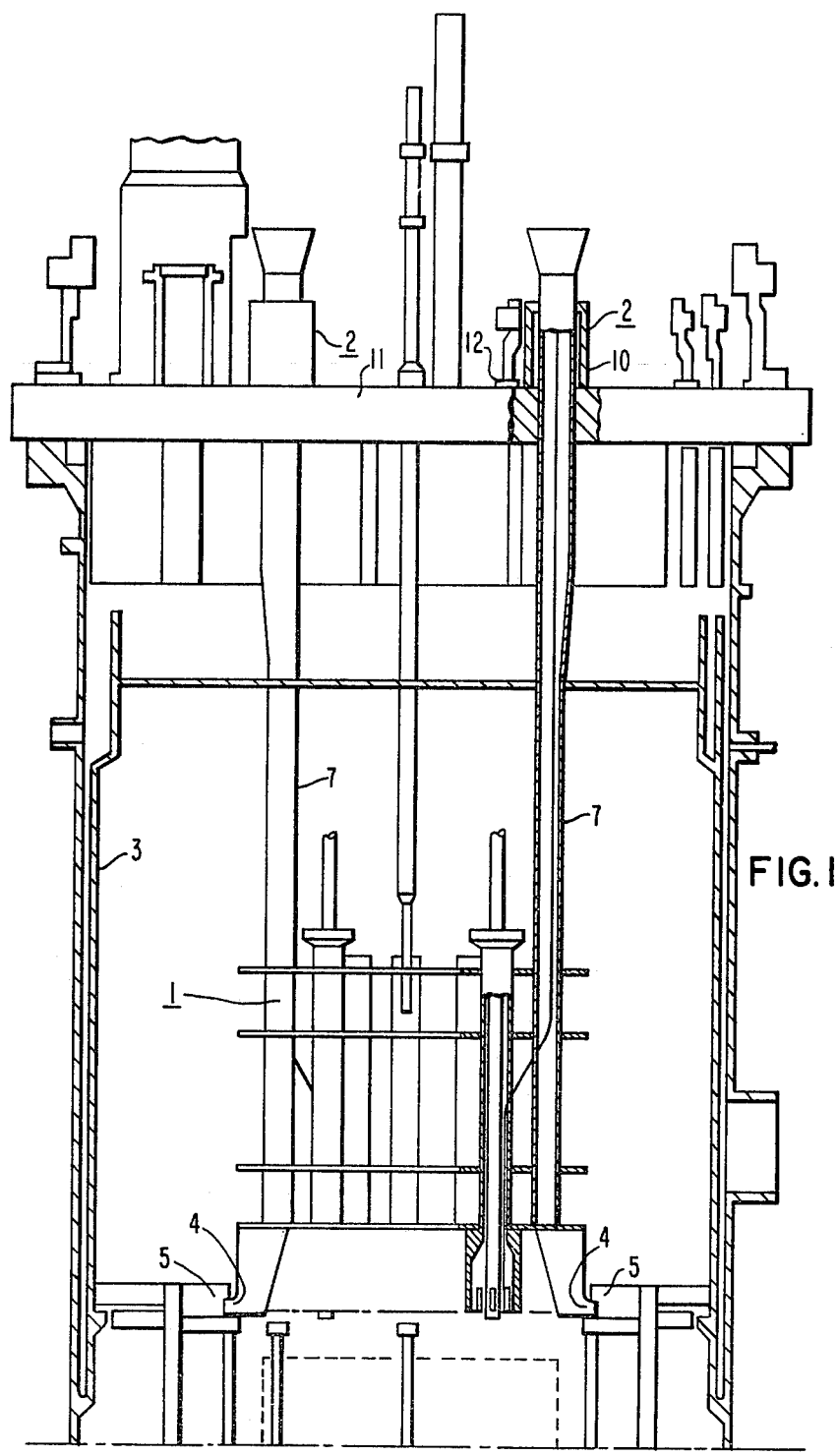
FIG. 1 is a schematic elevation of a liquid metal reactor having an upper internal structure.

Refer to FIG. 1 which shows the general arrangement of upper internals structure 1, (UIS) UIS jacking mechanism 2 (UISJM), core barrel 3, keys 4 and slots 5. The UISJM 2 provides positive vertical and lateral support of the UIS during reactor operation, and raises the UIS sufficiently to clear slots 5 prior to rotation of reactor closure head intermediate plug 11.

The UISJM is composed of four identical ball screw jacks 6, (see FIGS. 1, 2 and 3) one connected to each of the UIS support columns 7, and mechanically driven by a motor 8 mounted on one of the ball screw jack's support plate 12. An interconnecting drive shaft 13 and gear arrangement provides the driving torque from the single motor 8 to the four jacks. Each jack is mounted on a jack housing 9, which, in turn, is bolted to a UISJM nozzle 10. The four UISJM nozzles 10 are part of the intermediate rotating plug 11 of the reactor head. Vertical motion is imparted to each UIS support column 7 by the inverted ball screw jack located above the UIS support column 7. Each ball jack can exert a 100,000 lb. thrust on its particular support column 7 in either direction of travel with a maximum jacking velocity of 0.5 inches per minute. The ball screw jack and drive components are supported by the ball screw jack housing 9.

Figure 2:
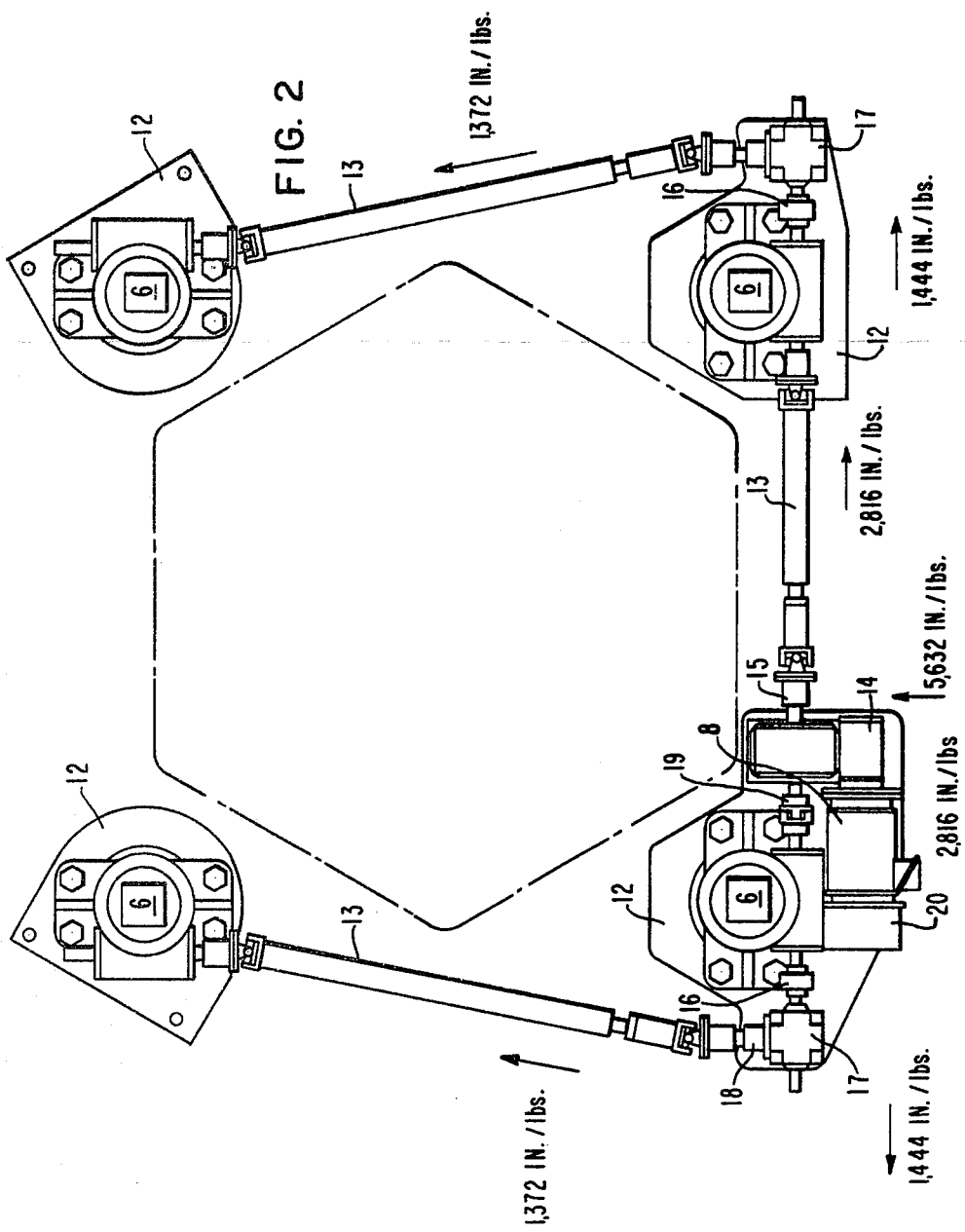
FIG. 2 is a plan view of the jacking mechanism.

The components of the UISJM visible in FIG. 2 are standard units, available commercially from the sources indicated in Table 1.

TABLE 1

Commercial Sources of Standard Components

| FIG. 2 Number | Vendor | Identity |
|---|---|---|
| 8 | Westinghouse | motor, 1750 RPM, frame 184TC, MTD brake & double C-face flange |
| 14 | Winsmith | worm gear speed reducer TMCTD-75:1-184 TC-LU-LR |
| 15 | Watson | stock bore flange W41 std. 1.75 dia. bore with .375 × .187 kw |
| 16 | Pow-R-Jac Div. LIMITORQUE Corp. | gear-type flexible couplings (nylon sleeve) Model No. MF |
| 17 | Pow-R-Jac Div. LIMITORQUE Corp. | straight tooth bevel gear box assy. BB-905 type 4, 1 to 1 ratio |
| 6 | Pow-R-Jac Div. LIMITORQUE Corp. | ball screw jack (inverted keyed) 5CBS J-1K 18,000 raise 32:1 ratio (4 required) |
| 13 | Watson | drive shaft WV-A41 shaft × 54,00 LG (2 required) |
| 18 | Pow-R-Jac Div. LIMITORQUE Corp. | straight tooth bevel gear assembly BB-905 type 3, 1 to 1 ratio |
| 19 | Browning | jaw-type couplings CHJ56, 1.50 dia. bore and std. J56B insert (bronze) |
| 20 | Stearns | brakes, Series 57,000 Model No. 1-057-021 |

As depicted in FIG. 2, four jack columns are incorporated into the UISJM. Three would suffice to bear all loads, but four are provided because columns 7 are also used to route instrumentation cables out of the reactor, and these cables are so numerous that four support columns are needed to meet this function.

Figure 3:
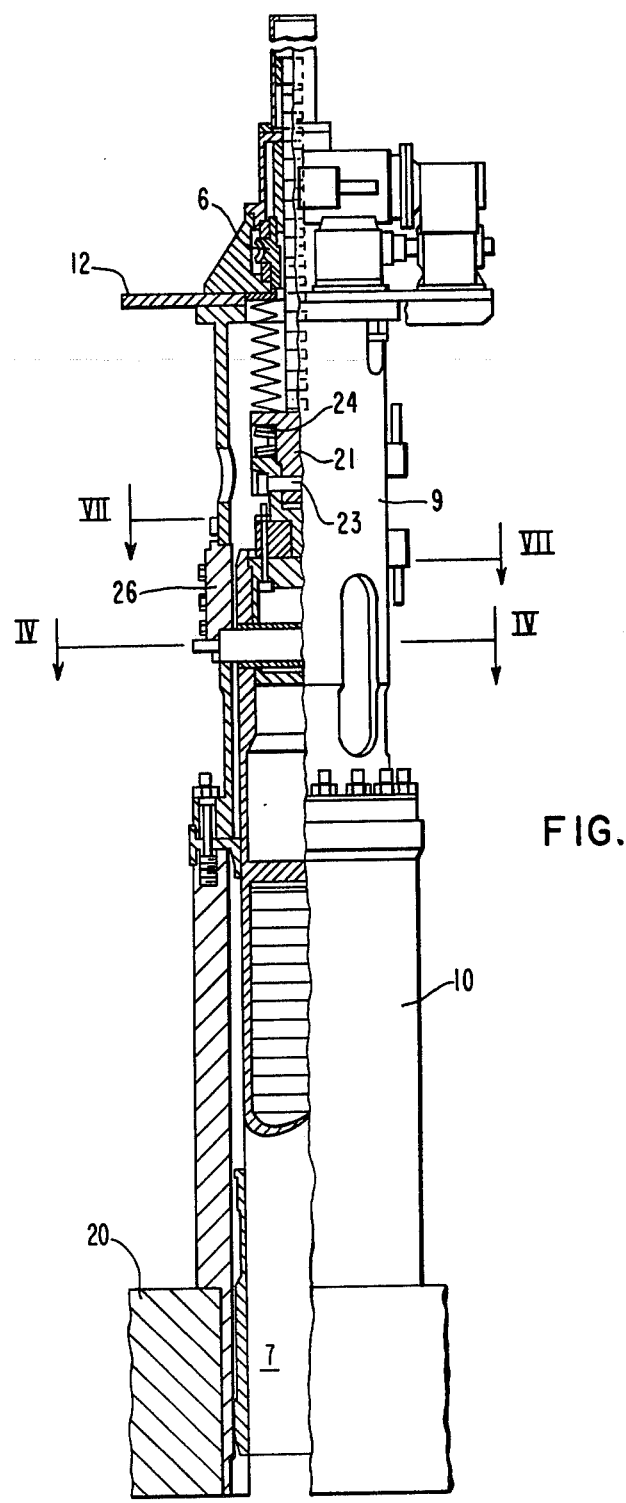
FIG. 3 is an elevation view of one ball screw jack column.
Figure 4:
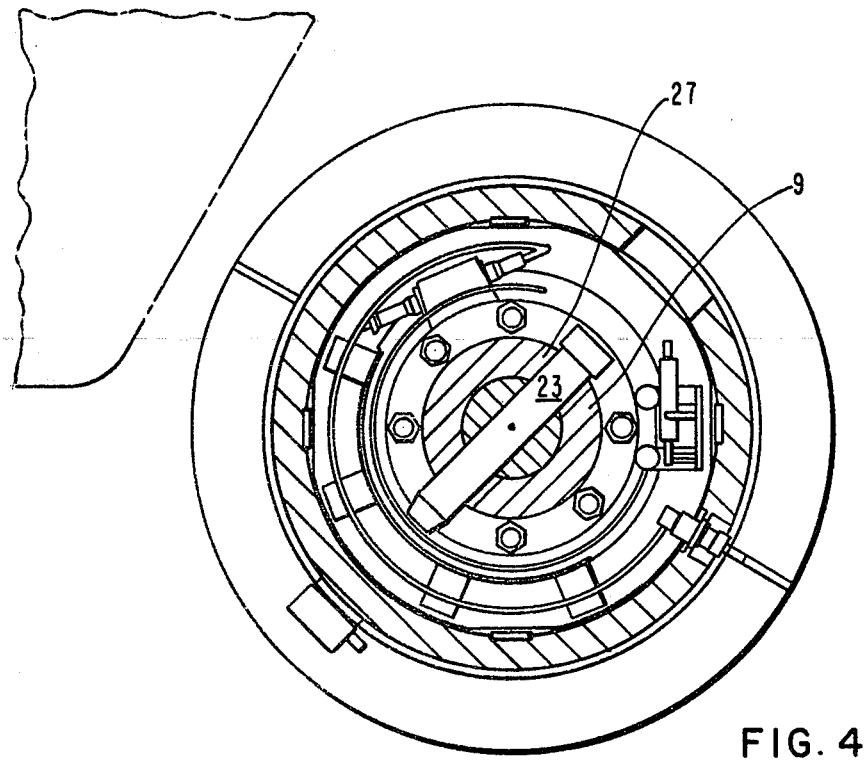
FIG. 4 is a plan view taken as indicated from FIG. 3.

Refer to FIGS. 3 and 4, which show details of one jack and column of the four provided. The support column 7, from all four of which the UIS hangs, is a hollow tube encased at the upper elevation shown in FIG. 3 by UIS nozzle 10 and jack housing 9. Ball jack 6 is affixed to column 7 and can raise and lower column 7 and consequently, the UIS. The juncture between reactor head 20 and nozzle 10, and the juncture between nozzle 10 and jack housing 9 have sealing systems comprising O-rings and inert gas purge streams to prevent gas from within the reactor from escaping.

Figure 5:
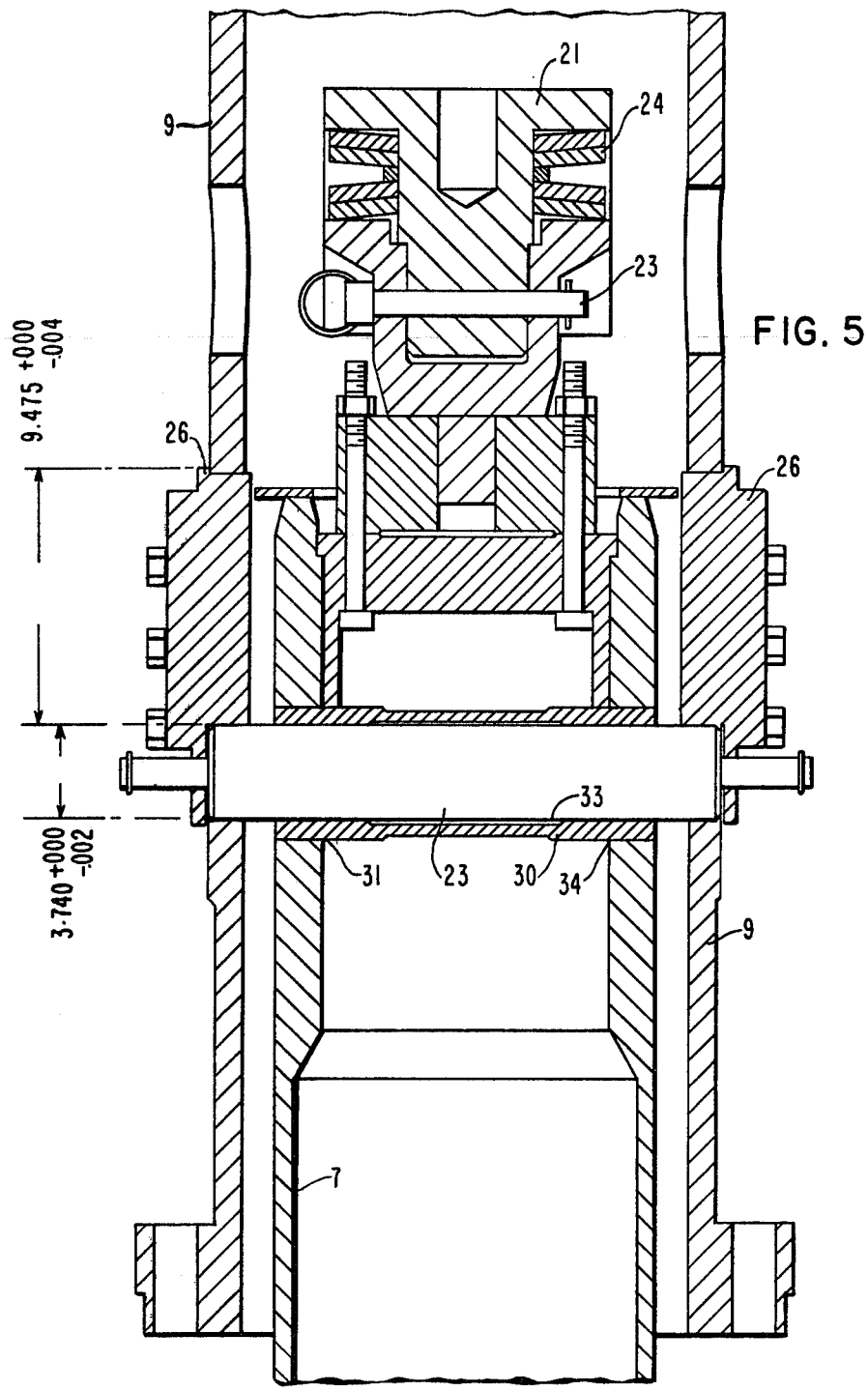
FIG. 5 is a section detailed from FIG. 3 shown in the "down" position.
Figure 6:
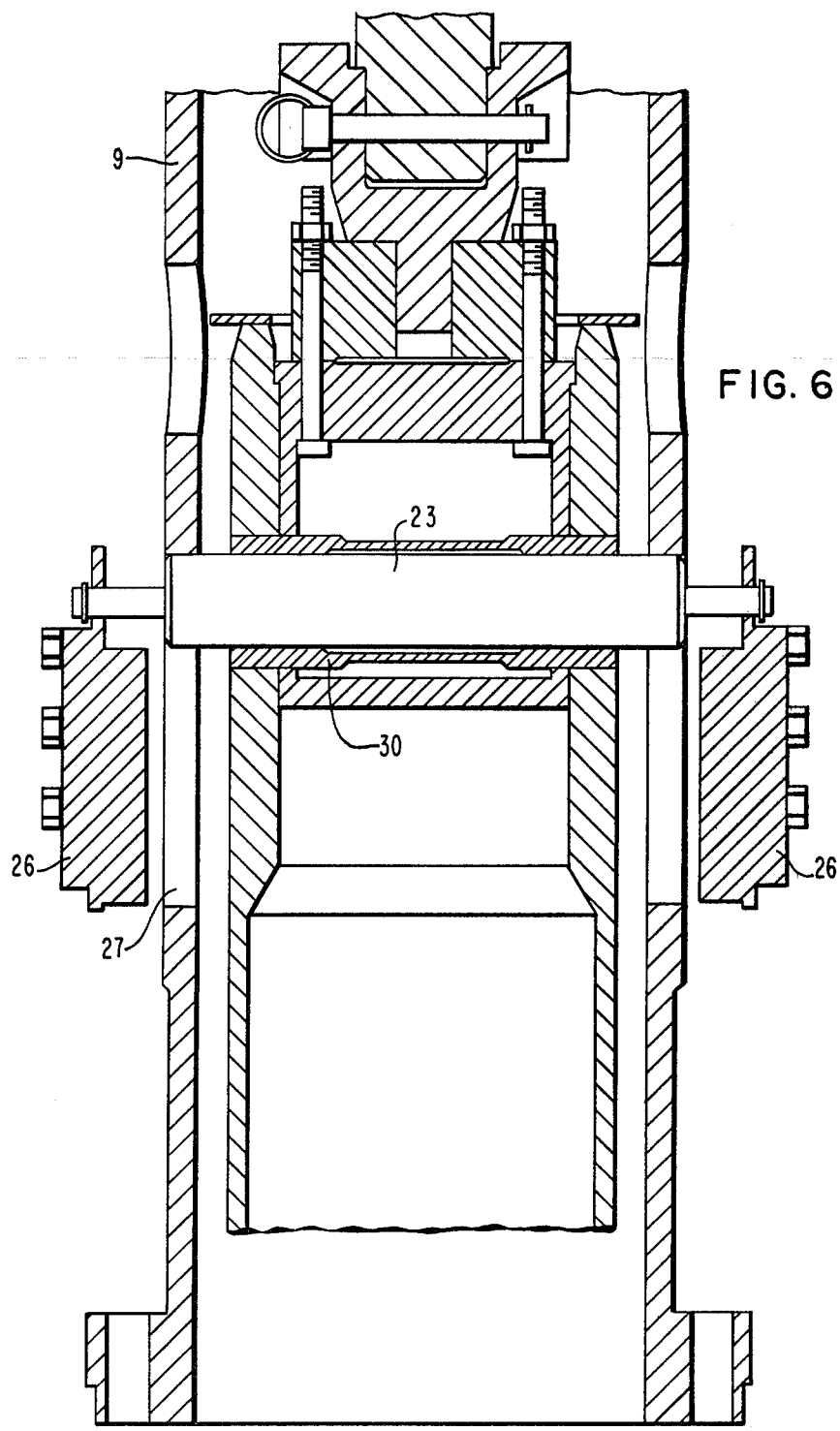
FIG. 6 is a detail from FIG. 3 shown in the "up" position.
Figure 7:
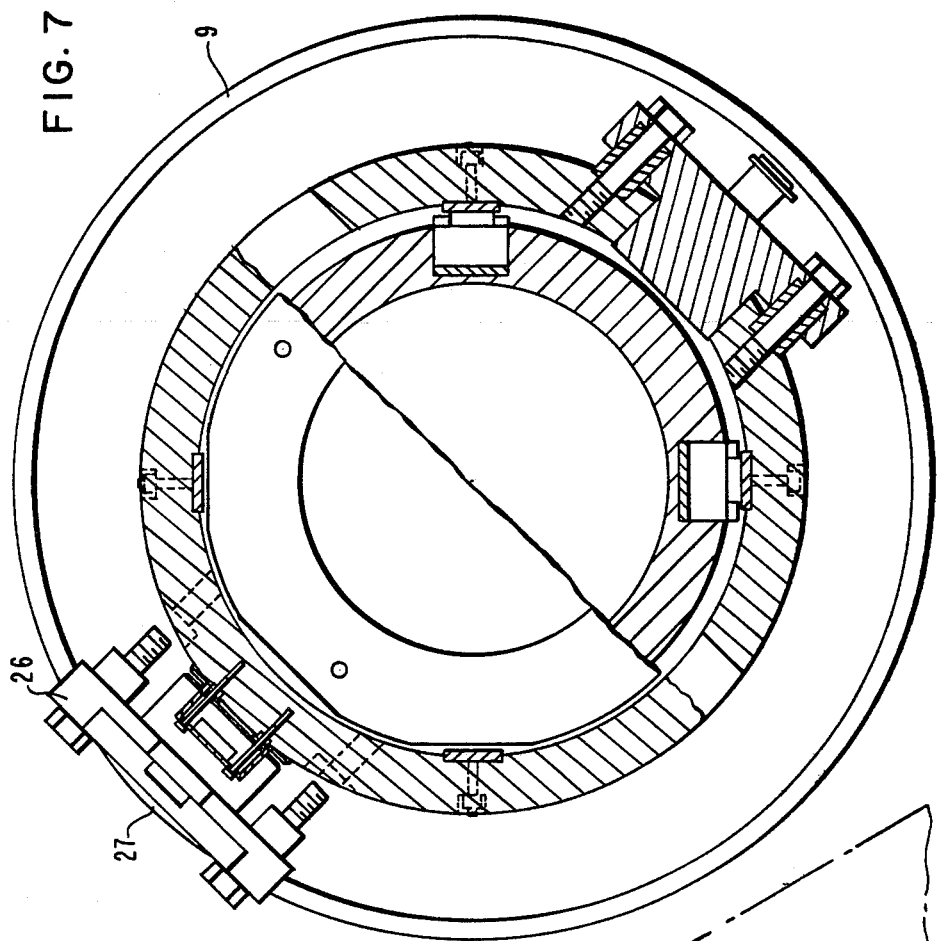
FIG. 7 is a plan view taken as indicated in FIG. 3.
Figure 8:
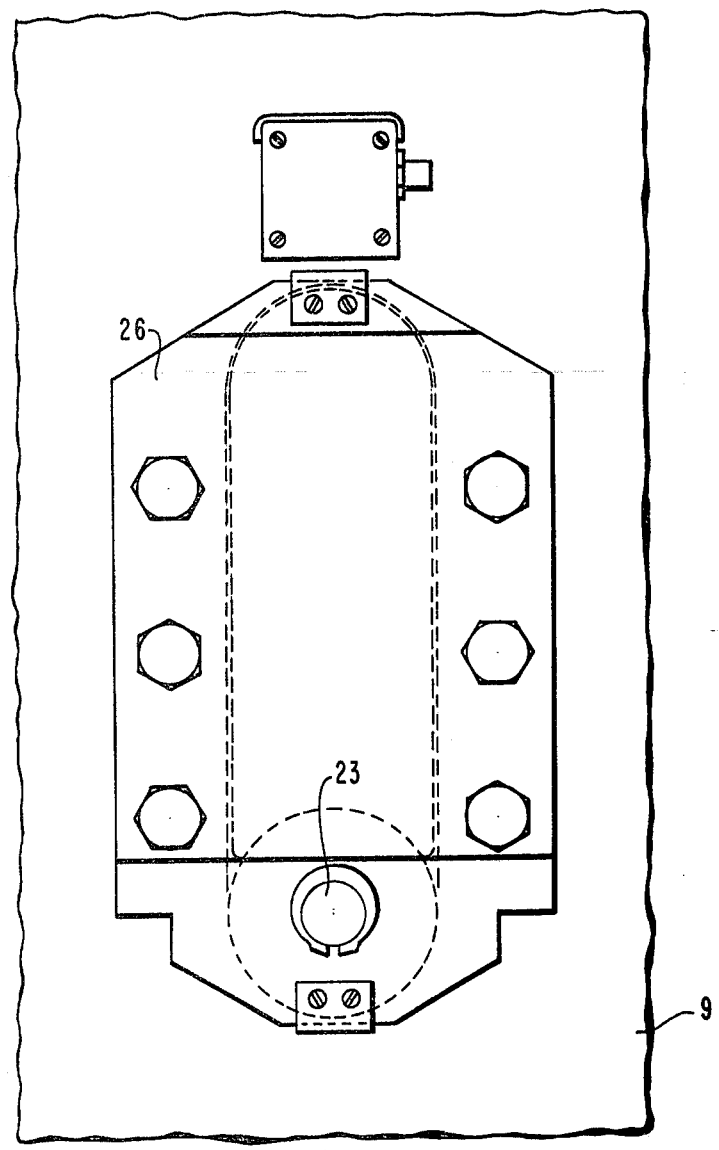
FIG. 8 is a detail of one locking plate.

The mechanical connection between each screw jack 6 and UIS support column 7 consists of a preloaded clevis 21 (FIG. 5), a load cell and support pin 23 located within the jack housing. The load cell monitors the vertical forces (either up or down) transmitted to the UIS support column 7. Any one of the four load cells will stop the drive motor 8 if predetermined loads are exceeded. The purpose of the preload in clevis 21 is to eliminate positioning inaccuracies caused by backlash (a tolerance or clearance) in the clevis. The spring preloaded clevis 21 also limits the amount of operational loads that may be transmitted to the drive components. The preloaded clevis also isolates the ball screws from large vertical loads during reactor operation. This is accomplished by preloading the attachment using large Belleville springs 24. These springs will start to compress when the up load reaches a predetermined load limit for the drive components. When the load limit is reached, the displacement of the springs is sufficient to compensate for clearances in the locking devices, without overloading the drive components. In addition, under extreme insertion loads of the UIS, the spring loaded clevis provides for "flexibility" in the system which prevents overloading of one jack due to small differences in displacement between the columns.

Anti-friction bearings are utilized between the UIS support columns and the UISJM jack housings to minimize loads in the UISJM.

Table 2 discloses parameters considered to be of the preferred embodiment.

TABLE 2

JACKING MECHANISM SIZING

|   |   | lbs. |
|---|---|---|
| 1 | LOAD FOR ¼" EXPECTED MISALIGNMENT OF UIS KEYS WITH SLOT | = 120,000 |
| 2 | LOAD FOR CONSERVATIVE ⅜" MISALIGNMENT ASSUMPTION | = 200,000 |
| 3 | RATED CAPACITY OF BALL SCREW JACK (FOUR) | = 400,000 |
| 4 | MAXIMUM OVERLOAD CAPACITY OF BALL SCREW JACK (AND STILL FUNCTION) | = 520,000 |
|   |   | inch lbs. |
| 5 | TOTAL TORQUE REQUIRED FOR MAXIMUM OVERLOAD | = 5,632 |
| 6 | GEAR REDUCER CAPACITY FOR ¼ HOUR OPERATION (14 IN FIG. 2) | = 6,583 |
| 7 | REQUIRED TORQUE BASED ON RUNNING TORQUE ⅜" MISALIGNMENT | = 2,166 |
| 8 | REQUIRED TORQUE BASED ON RUNNING TORQUE ¼" MISALIGNMENT | = 1,300 |

Locking Plate System

Refer to FIGS. 5, 6, 7 and 8.

Each housing assembly contains a locking mechanism which locks UIS support columns 7 in either an up (FIG. 6) or down (FIG. 5) position. The locking mechanism consists of two plates 26 bolted 180 degrees apart into vertical slots 27 in housing 9. One end of each plate 26 is designed to pivot about UIS support pin 23 and to provide a static bearing surface for UIS support pin 23. Lock plates 26 are designed to be withdrawn prior to and during either raising or lowering the UIS and to be immediately afterwards reinserted (installed), and bolted in place which locks the UIS in either the raised position (refueling) or in the lowered position (reactor operating).

When installed, plates 26 react all operational, seismic, accident, and other loads from UIS support columns 7 and transmits the loads to jack housing 9. Loads of nearly 1 million pounds per column are reacted by these (there are four) plates 26 without causing the loads to be transmitted to the relatively weaker ball screw jacks. This is critical, otherwise much larger drive components would be required which would cause formidable problems with respect to space and drive component support.

No special tools are required for disengagement of locking plates 26. This is accomplished by having the dead weight load of the UIS on support pins 23 which rest on the bottom of slots 27 located in housings 7. This keeps loads, which could cause binding, off lock plates 26 making their disengagement load limited to essentially their own dead weight (about 100 lbs. each). After lock plates 26 are disengaged, the pins are free to travel up and down the slots (see FIG. 3). Note lock plates 26 ride up with the support pins making it unnecessary for any lifting equipment or loose parts. The locking plates also permit extreme accuracy in repositioning the UIS after refueling. In fact, after the plates are installed, the top of the UIS support columns are within 0.063 inches of an originally installed position assuming data appropriate to a preferred embodiment as discussed below. (The originally installed position of the support columns is considered to have no vertical misalignment of the UIS with the reactor core or core barrel keys).

| PROOF OF UIS POSITIONING VERIFICATION BY LOCKING PLATE INSTALLATION | | | |
|---|---|---|---|
| PREMISE: | IF THE PLATES ARE INSTALLED, THE TOPS OF THE UIS COLUMNS ARE WITHIN .063 INCHES OF ORIGINAL INSTALLED POSITION. | | |
| PROOF: | | | |
| 1 | CLEARANCE BETWEEN PLATE (26) AND SLOT (27) (ALL UNITS INCHES) | | |
| | LOCK PLATE (26) | + .000 | |
| | 9.475 | → | 9.473 ± .002 |
| | | − .004 | |
| | PIN (23) | + .000 | |
| | 3.740 | → | +3.739 ± .001 |
| | | − .002 | |
| | | | 13.212 ± .003 |
| | SLOT (27) | + .004 | |
| | LENGTH 13.242 | → | 13.244 ± .002 |
| | | − .000 | |
| | | AVERAGE CLEARANCE | .032 ± .005 |
| | | RANGE | .027–.037 |
| 2 | CLEARANCE BETWEEN SUPPORT PIN (23) O.D. AND SLEEVE (30) O.D. | | |
| | SUPPORT PIN | + .000 | |
| | O.D. 3.740 | → | 3.739 ± .001 |
| | | − .002 | |
| | SLEEVE | + .003 | |

| PROOF OF UIS POSITIONING VERIFICATION BY LOCKING PLATE INSTALLATION -continued | | | |
|---|---|---|---|
| | O.D. | 3.750 | → 3.7515 ± .0015 |
| | | − .000 | |
| | | AVERAGE CLEARANCE | .0125 ± .0025 |
| | | RANGE | .010–.015 |
| 3 | CLEARANCE BETWEEN SLEEVE (30) O.D. AND COLUMN HOLE (31) | | |
| | SLEEVE PIN | + .000 | |
| | O.D. | 4.745 | → 4.7435 ± .0015 |
| | | − .003 | |
| | COLUMN HOLE | + .003 | |
| | | 4.750 | → 4.7515 ± .0015 |
| | | − .000 | |
| | | AVERAGE CLEARANCE | .008 ± .003 |
| | | RANGE | .005–.011 |
| RESULT: | SIMPLE SUMMATION .0525 ± .0105 RANGE .063–.042 | | |

Locking plate installation should be accomplished without difficulty if the ball jack's motion is terminated due to compressive loading on the housing of each column as is the control arrangement, as shown below:

| LOCKING PLATE INSTALLATION FOR COLUMN LOCKING | |
|---|---|
| PREMISE: | LOCKING PLATES CAN BE INSTALLED IF TRAVEL TERMINATES DUE TO COMPRESSIVE LOADING ON THE HOUSING FOR EACH COLUMN MAXIMUM SCREW VARIATION IS .019 INCH IF ONLY AXIAL DISPLACEMENTS ARE CONSIDERED |
| | (a) SCREW BACKLASH .007 |
| | (b) LID TO SLEEVE GAP (33) .006 |
| | (c) SLEEVE TO COLUMN GAP (34) .006 |
| | .019 inch |
| | MINIMUM CLEARANCE = .027 − .019 = .008 inches (ENABLES INSTALLATION) |

Control System of Preferred Embodiment

Because misalignment of the UIS with the reactor core and the key slots of the core barrel is to be minimized, the preferred embodiment of the UISJM includes a load cell which cuts off motor 8 when the first (of 4) support pins 23 bears against a hard stop with a load of 100,000 lbs., indicating the first support column 7 (of 4) has reached the fully up (or down) position. The uncertainty in position of the support column for this first-to-arrive pin is then the tolerance, (or "backlash") of the ball screws plus the gap between the sleeve 30 and the support column 7 is compensated for by the compression of the Belleville springs which start to deflect at 85,000 lbs.

The above specification and the drawings are susceptible to various modifications without departure from the true spirit and scope of the invention as claimed. Therefore, the specification should be considered as illustrative rather than limiting.

We claim:

1. A jacking mechanism for raising and lowering the upper internals structure of a liquid metal nuclear reactor which jacking mechanism comprises:
   (a) at least one support column attached at one end to said upper internals structure, and having pin support means for lifting, supporting, and lowering said support column, said pin support means located at a second end of said support column;

(b) at least one housing attached to said reactor having a slot therethrough; said housing disposed such that a portion of said pin support means extends into and through said slot and slides upward and downward in said slot during upward and downward movement of said support column, and such housing having a surface for supporting said support column via latter-mentioned components;

(c) jacking means for raising and lowering said support column with respect to said housing, said jacking means attached to said housing and to said pin support means;

(d) at least one locking plate, attached to said portion of said pin support means, extending through said slot in said housing, said locking plate rotationally free with respect to said pin support means, having attachment means to said housing and having load bearing abutting surfaces arranged such that when said support column is in either a raised or a lowered position, said locking plate can be rotated to achieve alignment of said locking plate-to-housing attachment means, and also to achieve alignment of said abutting surfaces of said locking plate with said housing surface, such that said locking plate can then be attached to said housing, said support column then being supported by a load path from the support column, through the pin support means, through the locking plate via the abutting surfaces bearing on the housing surface, through the housing, and through the reactor, such that application of any force applied by said upper internals structure via said support columns to said jacking means is prevented.

2. The jacking mechanism according to claim 1 further comprising four support columns, four associated housings, four associated jacking means, and two locking plates associated with each support column.

3. The jacking mechanism according to claim 1 or 2 wherein said jacking means is a system of ball screw jacks arranged to transmit hoisting and lowering force from a single motor to said support columns.

* * * * *